(12) United States Patent
Campbell

(10) Patent No.: US 7,629,403 B2
(45) Date of Patent: Dec. 8, 2009

(54) ORGANIC DISPERSIONS OF INORGANIC PARTICLES AND COATING COMPOSITIONS CONTAINING THEM

(75) Inventor: Donald H. Campbell, Hartland, MI (US)

(73) Assignee: BASF Coatings AG, Muenster (DE)

( * ) Notice: Subject to any disclaimer, the term of this patent is extended or adjusted under 35 U.S.C. 154(b) by 411 days.

(21) Appl. No.: 11/460,649

(22) Filed: Jul. 28, 2006

(65) Prior Publication Data

US 2007/0026143 A1 Feb. 1, 2007

Related U.S. Application Data

(60) Provisional application No. 60/704,482, filed on Aug. 1, 2005.

(51) Int. Cl.
*B01F 17/00* (2006.01)

(52) U.S. Cl. .................. 524/431; 524/430; 524/445; 524/451; 524/493; 524/556; 210/800; 427/372.2

(58) Field of Classification Search .................. 524/432
See application file for complete search history.

(56) References Cited

U.S. PATENT DOCUMENTS

| 4,526,910 A * | 7/1985 | Das et al. ..................... 523/220 |
| 5,853,809 A | 12/1998 | Campbell et al. |
| 5,863,956 A * | 1/1999 | Kistenmacher et al. ....... 521/31 |
| 5,914,162 A * | 6/1999 | Bilkadi ..................... 428/35.8 |
| 6,472,467 B1 * | 10/2002 | Chiao ......................... 524/755 |
| 6,734,229 B2 * | 5/2004 | Parsons ...................... 523/216 |
| 6,759,478 B2 | 7/2004 | Anderson et al. |
| 2003/0212199 A1 | 11/2003 | Anderson et al. |
| 2004/0176529 A1 | 9/2004 | Anderson et al. |
| 2005/0095193 A1 * | 5/2005 | Adair et al. ................. 423/598 |

OTHER PUBLICATIONS

Esumi K. Journal of Colloid and Interface Science 241, 1-3 (2001).*
The International Search Report for PCT/US2006/029860, Filed Jul. 31, 2006 Including the Written Opinion of the Internation Searching Authority.
Decker, C., "Ultrafast Synthesis of Nanocomposite Coatings by UV Curing of Clay-or Silica-Filled Resins," Aug. 2005, PCI Paint & Coatings Industry, pp. 78-86.

* cited by examiner

*Primary Examiner*—David Wu
*Assistant Examiner*—Vu Nguyen
(74) *Attorney, Agent, or Firm*—Harness, Dickey & Pierce, P.L.C.

(57) ABSTRACT

The present invention provides a method of preparing an organosol of inorganic particles, comprising mixing an aqueous dispersion or sol of inorganic particles with an organic liquid and a polymer or oligomer having functionality that adsorbs onto the inorganic particles; and allowing the mixture to separate into an aqueous layer and an organic layer, the organic layer comprising the inorganic particles. The invention also provides a polymer composition or coating composition made by this method. A coating composition is applied to a substrate and cured to provide a coating layer on the substrate. A polymer composition containing the inorganic particles is molded into an article.

40 Claims, No Drawings

ORGANIC DISPERSIONS OF INORGANIC PARTICLES AND COATING COMPOSITIONS CONTAINING THEM

FIELD OF THE INVENTION

The invention relates to methods of making organosols of inorganic particles and compositions prepared therefrom. The invention also relates to industrial and automotive coating compositions, particularly to topcoat and clearcoat coatings and compositions.

BACKGROUND OF THE INVENTION

Clearcoat-basecoat composite coatings are widely used in the coatings art and are notable for desirable gloss, depth of color, distinctness of image and/or special metallic effects. Composite systems are particularly utilized by the automotive industry to achieve advantageous visual effects, especially a high degree of clarity. However, a high degree of clarity in the clearcoat makes it easier to observe defects.

Clays and silicas have been included in coating compositions to act as rheology control agents. In this capacity, the clays and silicas associate after spray application to form or re-form aggregates that thicken the applied coating to prevent sagging.

Aqueous silica sols have been converted into organic sols. The conversion methods have produced less than satisfactory organosols for coatings, however, because the sols are relatively high in organic solvent, generally include a solvent that would not have been selected for the particular coating, and if used in higher amounts the organic silica sols to date have tended to flocculate in organic coatings to produce a matt or reduced gloss coating. Campbell et al. in U.S. Pat. No. 5,853,809 describe adducting onto inorganic particles of an organic sol a group that reacts with a film former of a coating composition. In this case, the inorganic sol particles can be included in higher levels without flocculation, but the problem of the costly transfer of the particles from aqueous to organic sol remains, as well as an additional cost for the modification step.

Thus, it would be desirable to improve resistance of a clearcoat coating layer to scratching and marring without incurring the high cost associated with currently available silica organosols, particularly in an organic medium, as most clearcoat compositions are organic solvent compositions.

SUMMARY OF THE INVENTION

The present invention provides a method of preparing an organosol of inorganic particles, comprising mixing a mixture of inorganic particles and water, such as an aqueous dispersion or sol of the inorganic particles, with an organic solvent and a polymer or oligomer having functionality that adsorbs onto the inorganic particles; and allowing the mixture to separate into an aqueous layer and an organic layer, the organic layer being an organosol of the inorganic particles. In certain embodiments, the functionality of polymer that adsorbs onto the inorganic particles comprises quarternary ammonium groups. In such embodiments, the inorganic particles may have cations that form water-soluble salts with a counteranion of the quarternary ammonium groups, in which case the organosol may be formed without water-sensitive salts, which will be in the separated aqueous layer.

The present invention also provides a method of incorporating inorganic particles into a polymer composition, comprising mixing an aqueous dispersion or sol of inorganic particles with an organic solvent and a polymer or oligomer having functionality that adsorbs onto the inorganic particles; allowing the mixture to separate into an aqueous layer and an organic layer; and incorporating the organic layer into a composition comprising at least one polymer other than the polymer having functionality that adsorbs onto the inorganic particles. The method may be used to incorporate inorganic particles to act as a reinforcement into a moldable polymer material and may include a further step of molding the polymer material into an article, optionally along with curing the moldable polymer composition (in the case of a thermosetting composition).

The present invention further provides a method of preparing a coating composition, comprising mixing an aqueous dispersion or sol of inorganic particles with an organic solvent and a polymer having functionality that adsorbs onto the inorganic particles; allowing the mixture to separate into an aqueous layer and an organic layer; and incorporating the organic layer into a coating composition. In certain embodiments, the coating composition is a topcoat or clearcoat coating composition. In some embodiments, the organic layer may be treated to remove residual water before incorporating the organic layer into the coating composition.

In certain embodiments, the invention provides a method of preparing a coating composition, comprising mixing an aqueous sol of inorganic particles with an organic solvent and a polymer containing quarternary ammonium groups; allowing the mixture to separate into an aqueous layer and an organic layer; and incorporating the organic layer into a coating composition, such as a topcoat or clearcoat coating composition.

Among its embodiments, the invention provides a method of preparing a clearcoat coating composition and a clearcoat layer on a substrate. The clearcoat coating composition is prepared by a method comprising mixing an aqueous sol of silica particles with an organic solvent and a polymer having quarternary ammonium functionality; allowing the mixture to separate into an aqueous layer and an organic layer; and incorporating the organic layer into a clearcoat coating composition. The clearcoat layer on a substrate is provided by a method comprising applying the clearcoat coating composition onto a substrate, which may already have a layer of a basecoat coating composition.

The term "polymer" as used in describing this invention includes oligomers as well as polymers; thus, while oligomers are explicitly noted in some places, "polymer" should be read to include oligomers as well. The polymer having functionality that adsorbs onto the inorganic particles prevents unwanted flocculation of the inorganic particles if it is added with the inorganic particles into the coating composition in higher amounts, for example in amounts of more than about 2 weight percent.

The clearcoat and topcoat compositions of the invention have excellent scratch and mar resistance, as well as adhesion to high bake repair coating layers without use of special preparations or primer layers. Moreover, the present invention avoids the onerous and expensive procedures previously used to form organosols from aqueous silica dispersions or other aqueous sols of inorganic particles.

"A" and "an" as used herein indicate "at least one" of the item is present; a plurality of such items may be present, when possible. Other than in the working examples provided at the end of the detailed description, all numerical values of parameters (e.g., of quantities or conditions) in this specification, including the appended claims, are to be understood as being modified in all instances by the term "about." "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring such parameters.

DETAILED DESCRIPTION OF THE PREFERRED EMBODIMENTS

The following description of the preferred embodiment(s) is merely exemplary in nature and is in no way intended to limit the invention, its application, or uses.

The method of preparing an organosol of inorganic particles includes mixing an aqueous mixture of inorganic particles with an organic solvent and a polymer (or oligomer) having functionality that adsorbs onto the inorganic particles, and allowing the mixture to separate into an aqueous layer and an organic layer. Optionally, the organic layer may be treated to remove residual water before incorporating the organic layer into a further composition such as a coating composition or moldable plastic composition.

In embodiments of the invention in which inorganic particles are incorporated into a clearcoat coating composition, the particles may be substantially colorless or transparent to not substantially affect the appearance of the clearcoat with regard to color or gloss.

The optimum particle size of the inorganic particles for a particular embodiment may depend upon the type of composition, e.g. coating composition, into which the inorganic particles are incorporated, the shape and refractive index of the inorganic particles, and the particle size distribution of the inorganic particles used. As used in describing the invention, the "particle size" refers to the smallest dimension, e.g., diameter of smallest diameter sphere that will completely enclose the particle for a generally spherical particle or average thickness for flake-type particles. In certain embodiments, the inorganic particles have an average particle size of less than 50 microns prior to incorporation into the coating composition. In certain embodiments the inorganic particles have an average particle size of less than 150 nm, in certain embodiments less than 100 nm, and in certain embodiments less than 50 nm prior to incorporation into the coating composition. In some embodiments, the particles have an average particle size in the range of from 1 to 1000 nanometers prior to incorporation into the coating composition. Also in some embodiments, the particles have an average particle size in the range of from 1 to 100 nanometers prior to incorporation into the coating composition. In yet other embodiments, the particles have an average particle size in the range of from 1 to 50 nanometers prior to incorporation into the coating composition. In certain embodiments, the particles have an average particle size of at least about 1 nm, in certain embodiments at least about 2 nm, in some embodiments at least about 4 nanometers, and in some embodiments at least about 10 nm prior to incorporation into the coating composition.

Methods accepted in the art for measuring particle sizes include visually examining an electron micrograph of a transmission electron microscopy image, measuring particle diameters of the image, and calculating an average particle size based on the magnification of the image.

Among suitable inorganic particles are, without limitation, particles that are generally spherical such as solid beads, microbeads, and hollow spheres, and particles that are cubic, platy, and elongated, e.g., whiskers or microfibers. Additionally, the particles may have an internal structure that is hollow, porous, or substantially free of voids. The particles may comprise an inorganic material or a combination of two or more differing materials. For example, a particle can be formed from a primary material that is coated, clad, or encapsulated with one or more secondary materials to form a composite particle. The inorganic particles may be discrete or associated into aggregates.

Suitable inorganic materials that can be used to form the inorganic particles include, without limitation, metal oxides (e.g., silica and zinc oxide), metal carbides (e.g., silicon carbide), metal nitrides (e.g., silicon nitride and boron nitride), metal sulfides (e.g., molybdenum disulfide), metal silicates (e.g., aluminum silicates, magnesium silicates, and mixed metal silicates), metal borides, metal carbonates (such as manganese carbonate), and combinations of these. The particles may comprise, for example, a single inorganic oxide such as silica in colloidal, fumed, or amorphous form, alumina or colloidal alumina, zirconia in colloidal or amorphous form, and combinations of these, or may combine any of these as a core material and deposited on the core an inorganic material of another type.

In particular embodiments, the inorganic particles are selected from silica, alumina, silicone carbide, zirconia, yttria, clay, talc, and combinations of these.

A mixture of water and the inorganic particles, e.g. an aqueous dispersion or sol of the inorganic particles such as an aqueous sol of silica or clay particles, is mixed with an organic solvent and a polymer containing functionality that adsorbs onto the inorganic particles. The organic solvent is an organic compound or a combination of organic compounds that is liquid under the ambient conditions of mixing. The organic solvent should be at least a theta solvent for the polymer under the conditions of mixing. When the organic solvent is mixed by itself with water, the organic solvent and water should be able to separate into distinct layers or phases after mixing is stopped. Thus, the organic solvent should be substantially immiscible with water. An organic compound that is soluble in water may, in general, be included in the organic solvent in a minor amount, so long as the mixture of organic compounds forming the organic solvent as a whole separates from water after mixing. For example, ethanol could be a component of the organic solvent, but should only be included in a minor amount when it is desired to have the aqueous and organic materials rapidly separate on standing after mixing.

Particular examples of suitable solvents include, without limitation, ketones, esters, alcohols (particularly those having four or more carbon atoms), aromatic hydrocarbons, ethers, ether alcohols, ether esters, amines, aliphatic hydrocarbons, and mixtures of these, including such specific solvent compounds as methyl ethyl ketone, methyl isobutyl ketone, m-amyl acetate, toluene, xylene, blends of aromatic hydrocarbons like Aromatic 100, and butyl acetate. When the organosol is to be included in a moldable polymeric composition, the organic solvent may be or include a solvent that is removed before molding or further processing of the polymeric composition and/or a plasticizer that is liquid at the ambient conditions of mixing (the water must be liquid water), such as dibutyl phthalate or dioctyl phthalate.

The polymer containing functionality that adsorbs onto the inorganic particles may be any polymer soluble in the selected organic solvent or liquid. Suitable polymers include, without limitation, polymers of alpha, beta unsaturates, vinyl polymers, acrylic polymers, silicones, polyesters, polyethers, polycarbonates, polyamides, polyurethanes, and graft copolymers of these with each other or other polymers.

The functionality that adsorbs onto the inorganic particles may have ionic attraction to group(s) of the inorganic particles, hydrogen bonding interaction, or other affinity that allows the polymer to become adsorbed onto the surface to a sufficient degree to draw the inorganic particles into the organic solvent medium. Functionality that adsorbs onto the inorganic particles includes, without limitation, salt groups such as quarternary ammonium salts, hydrogen bonding groups, and combinations of such groups. The optimum interactive groups will depend upon the particular inorganic particles. In certain embodiments, the inorganic particles contain cations that may be displaced by quarternary ammonium groups of the polymer to effect adsorption of the polymer onto the inorganic particles. If the counterion of the quarternary ammonium salt forms a water soluble salt with the displaced cations, then the water soluble salt may be left in the aqueous phase after phase separation, while the inorganic particles with adsorbed polymer passes into the organic phase. This action is beneficial when the organic dispersion of the inorganic particles in put into a coating, as the presence of water soluble salts would otherwise have brought water sensitivity to the coating.

The functionality that adsorbs onto the inorganic particles may be a functional group present on one or more monomers during polymerization, or the polymer may be further reacted following polymerization to form on it the desired functionality that interacts with the inorganic particles. Taking one embodiment for illustration, that of an acrylic polymer with quarternary ammonium groups, the polymer may be formed by copolymerizing a monomer having a quarternary ammonium group, or an acrylic polymer having functionality, such as a tertiary amine, could be further reacted to provide the quarternary ammonium groups, for instance by quarternizing the amine groups. As another example, an acrylic polymer prepared using a polymerizable anhydride, e.g., maleic anhydride, could be reacted with a compound having an alcohol group and a tertiary amine group, the tertiary amine group afterward being quarternized to provide the desired quarternary ammonium groups. Examples of (meth)acrylate monomers with quaternary ammonium functionality include, but are not limited to, trimethylammoniummethyl methacylate chloride and methacylamidopropyltrimethylammonium chloride. Quaternary ammonium monomers suitable for the synthesis of polyesters and polyurethanes can be made, for example, from the quaternization of an amino alcohol (such as dimethylethanolamine) with and epoxide compound (such as glycidyl neodecanoate) to form a quaternary ammonium functional diol monomer, which is then generally polymerized, optionally with further diol monomers, with dicarboxylic acids to form a polyester or with diisocyanates to form a polyurethane.

The polymer's content of functionality that adsorbs onto the inorganic particles may vary. In general, at least 1 and up to 80 mole percent of the monomeric units of the polymer may comprise a functional group that adsorbs onto the inorganic particles.

In certain embodiments where an oligomer having functionality that adsorbs onto the inorganic particles is used to form the organosol or organic solvent dispersion of the inorganic particles, the oligomer may further include a polymerizable functionality. The polymerizable functionality may be any suitable functionality that may be used in a further addition or condensation polymerization following formation of the organosol. In one nonlimiting exemplary embodiment, the oligomer having functionality that adsorbs onto the inorganic particles further has ethylenic unsaturation, preferably one ethylenically unsaturated group, that is polymerized in the present of an initiator (e.g., a peroxide or photoinitiator) under appropriate conditions after the organosol is formed, optionally with introduction of other polymerizable materials. As mentioned, an oligomer having functionality that adsorbs onto the inorganic particles may further include condensation or stepwise polymerizable functionality. Comonomers may be introduced with the oligomer or may be introduced following formation of the organosol. Polymerization may be carried out under appropriate conditions (e.g., with heat and or introduction of a catalyst) following formation of the organosol.

The invention also provides embodiments in which the polymer having functionality that adsorbs onto the inorganic particles has groups reactive with the vehicle of a thermoset coating composition into which it is formulated. By "vehicle" is meant the film-forming materials in the coating composition, generally one or more thermosetting materials that react together to cure the applied coating composition. Many such curable vehicles are known in the coatings art, particularly for industrial and automotive coatings. It may be mentioned that among the more commercially important chemistries at present are hydroxyl and/or carbamate functional materials crosslinked with aminoplast resins; hydroxyl and/or primary or secondary amine functional materials crosslinked with polyisocyanates (blocked for one-package coatings); epoxide functional materials crosslinked with polycarboxylic acids and acid functional materials crosslinked with polyepoxides; silane functional resins that cure with water, and combinations of curing chemistries. Similarly, the polymer having functionality that adsorbs onto the inorganic particles may have groups reactive with one or more components of a thermosetting, moldable polymer composition into which it is incorporated.

The polymer (or oligomer) having functionality that adsorbs onto the inorganic particles has a molecular weight suitable for forming a stable organosol of the inorganic particles. In general, the polymer (or oligomer) may have a weight average molecular weight of at least 700. In other embodiments, the polymer may have a weight average molecular weight of at least 1000, in yet other embodiments at least about 2000, and in still other embodiments at least about 4000. Depending upon the type of polymer (i.e., addition polymer or condensation polymer), the polymer weight average molecular weight may be up to 100,000. For certain thermoset coating composition embodiments, the polymer weight average molecular weight may be up to 20,000; in other embodiments, the polymer weight average molecular weight may be up to 10,000. While not wishing to be bound by theory, it is believed that in some coating composition embodiments a higher polymer molecular weight may lead to a higher gloss in the applied coating. Thus, a very low molecular weight oligomer may produce low gloss coatings, while a higher molecular weight provides high gloss coatings, even when the treated inorganic particle is included in the coating composition in high amounts (e.g., 1:1 by weight of solid film-forming resin). The disclosed coating compositions in general, however, provide higher gloss compared to previously known coatings containing the same weight percent of inorganic particles. While again not wishing to be bound by theory, this is believed to result from improved compatibility of the polymer-treated inorganic particles with the vehicle (resin components) of the coating composition. Hence, gloss may be increased by selecting a polymer with improved compatibility with the coating vehicle.

The polymer having functionality that adsorbs onto the inorganic particles is selected to be compatible with a vehicle of a coating composition or a moldable polymer composition into which the organosol is to be incorporated. Other properties of the polymer, such as glass transition temperature, may vary depending upon many factors, including the desired properties of the coating or plastic material into which the organic dispersion of inorganic particles is formulated.

A mixture of water and the inorganic particles is mixed with the organic solvent or liquid and the polymer having functionality that adsorbs onto the inorganic particles. A sufficient amount of the organic solvent or liquid and the polymer is used to bring about the transfer of the inorganic particles into the organic solvent. In the case of an ionic interaction between the polymer and the inorganic particles, a ratio of one or more equivalents of the ionically interacting functional groups (e.g., quarternary ammonium groups) for each equivalent of cation of the inorganic particle that will be replaced is found to provide a more facile phase separation after mixing. In addition, equal or excess equivalents of the interacting functionality will aid in removing water sensitive cations from the inorganic particles. Although anionic particles, such as silica, are best modified with cationic polymers, such as quaternary ammonium functional resins, cationic particles, such as alumina, would be best modified with anionic polymers, such as carboxylate functional resins. Thus, the functionality that adsorbs onto the inorganic particles may be different for different kinds of inorganic particles.

Mixing can be carried out using equipment common in polymer and coating composition manufacturing, as high shear mixing may generally not be required. However, if the particles exist in an agglomerated state, then shear can be applied by high shear mixers or sonication to effect de-agglomeration. The mixture may comprise up to 60% by weight solid materials, which may include up to 50% by weight inorganic particles and up to 20% by weight polymer.

Residual water can be removed by, for example, vacuum distillation, by membrane permeation, or with a desiccant. Alternatively, small amounts of water may be acceptable in the organosol depending on the particular coating composition where it will be used.

The organic solvent dispersion of the inorganic particles may be incorporated into a further composition, such as one in which the inorganic particles provide an advantageous effect on properties. In non-limiting examples, the organic solvent dispersions of the inorganic particles may be incorporated into thermoplastic, thermoset, or rubber compounding compositions for molded articles and films and into coating compositions. In some embodiments, the inorganic particles may be up to 66% by weight of the solid material of the composition. Particularly for coating compositions, the inorganic particles may be included in amounts up to a point at which the composition can no longer form a cohesive film of a desired appearance. In some embodiments, a coating composition may comprise up to 50% by weight of the inorganic particles, based on the total weight of nonvolatile material.

In certain embodiments, the organic solvent dispersion of the inorganic particles is incorporated into a topcoat or clearcoat composition and formed into an uppermost layer of coating on a substrate. The inorganic particles may increase the scratch or mar resistance of an uppermost coating layer. In some embodiments, the inorganic particles are incorporated into a coating composition that is not a clearcoat composition, such as a colored topcoat (e.g., a one-coat enamel topcoat) or another coating composition, particularly one intended to form an outermost layer on a coated substrate. In the case of a multi-package coating composition, such as a coating having a separate curing agent package or a refinish coating having multiple separate components that are combined just prior to application, the particles is incorporated into at least one of the separate packages or components and may be incorporated into a plurality of the separate package or components from which the coating composition is mixed just prior to application. In other embodiments, the inorganic particles dispersion may be incorporated into other types of coating compositions, such as primers, adhesion promoters, basecoat coating compositions, and so on.

The coating composition may be a thermosetting, or curable, coating composition. Curable coating compositions are well known and, in general, employ film forming materials that cure at room temperature, thermally, with application of actinic radiation, or with a combination of these. The film forming materials may be polymeric, oligomeric, or monomeric; the film forming materials may be self-crosslinking or may comprise a crosslinkable material and a crosslinker or curing agent reactive with the crosslinkable material and combinations of these. Non-limiting examples of film forming materials include acrylic polymers, modified acrylic polymers (e.g., modified with polyester or polyurethane moieties), polyesters, polyepoxides, polycarbonates, polyurethanes, polyamides, polyimides, polyethers, and polysiloxanes, all of which are well known in the art. In coatings that cure by actinic radiation, the film forming material will comprise an unsaturated, polymerizable material, for example a material with ethylenic unsaturation, that undergoes addition polymerizable upon exposure to the actinic radiation.

In one preferred embodiment of the invention, the polymer is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Acrylic polymers are well-known in the art, and can be prepared from monomers such as methyl acrylate, acrylic acid, methacrylic acid, methyl methacrylate, butyl methacrylate, cyclohexyl methacrylate, and the like. The acrylic polymer contains a crosslinkable functional group, for example an active hydrogen-containing functional group, that is reactive, for example, with a curing agent of the coating composition. The crosslinkable functional group may be incorporated into the acrylic polymer through the selection of a suitable ethylenically unsaturated functional monomer. For example, hydroxy-functional acrylic monomers that can be used to form such polymers include hydroxyethyl acrylate, hydroxybutyl acrylate, hydroxybutyl methacrylate, hydroxypropyl acrylate, hydroxypropyl methacrylate, and the like. Amino-functional acrylic monomers that can be used include tert-butylaminoethyl methacrylate and tert-butylamino-ethylacrylate. Carbamate functional acrylics are especially preferred for use as binder (A) herein. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic).

Another method of synthesis reacts an alpha, beta-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art. Another method of synthesis reacts an alpha, beta-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing the polymer (A) used in the curable coating composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. A different technique for preparing polymers useful as component (A) involves thermally decomposing urea (to give off ammonia and HNCO) in the presence of a hydroxy-functional acrylic polymer to form a carbamate-functional acrylic polymer. Another method involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

Modified acrylics can also be used as the polymer or binder (A) in the curable coating compositions of the invention. Such acrylics may be polyester-modified acrylics or polyurethane-modified acrylics, as is well known in the art. Polyester-modified acrylics modified with epsilon-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters having active hydrogen groups such as hydroxyl groups can also be used as the binder (A) in the curable coating composition according to the invention. Such polyesters are well known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Polyurethanes having active hydrogen functional groups are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

The coating composition may further includes one or more curing agents. Useful curing agents include, without limitation, materials having a plurality of groups reactive with functionality of the curable material in the coating. Non-limiting examples of groups that are reactive with functionality typical of curable coating materials include active methylol or methylalkoxy groups on aminoplast crosslinking agents or on other compounds such as phenol/formaldehyde adducts, isocyanate groups, siloxane groups, cyclic carbonate groups, and anhydride groups. Particular examples of aminoplast curing agent compounds include melamine formaldehyde crosslinkers, including monomeric or polymeric melamine formaldehyde resin and partially or fully alkylated melamine formaldehyde resin, urea resins, and methylol ureas such as urea formaldehyde resin, alkoxy ureas such as butylated urea formaldehyde resin. Particular examples of other curing agents include, without limitation, blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane).

In certain embodiments, the curing agent or crosslinker may be at least about 5%, or at least about 10% by weight of the nonvolatile vehicle. "Nonvolatile vehicle" refers to the film-forming components. In certain embodiments, the curing agent or crosslinker may be up to about 40%, or up to about 30% by weight of the nonvolatile vehicle.

The clearcoat coating composition may include a catalyst to enhance the cure reaction. For example, especially when monomeric melamines are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine.

In the case of film forming materials curable with actinic radiation, suitable non-limiting examples include monomers and oligomer containing one or more of a (meth)acrylate group, an ethacrylate group, a crotonate group, a cinnamate group, a vinyl ether group, a vinyl ester group, an ethenylarylene group, a dicyclopentadienyl group, a norbornenyl group, a isoprenyl group, an isopropenyl group, an allyl group, a butenyl group, an ethenylarylene ether group, a dicyclopentadienyl ether group, a norbornenyl ether group, an isoprenyl ether group, an isopropenyl ether group, an allyl ether group, a butenyl ether group, an ethenylarylene ester group, a dicyclopentadienyl ester group, a norbornenyl ester group, an isoprenyl ester group, an isopropenyl ester group, an allyl ester group, and a butenyl ester group.

A solvent or solvents may be utilized in the coating composition. In general, the solvent can be any organic solvent. In one preferred embodiment, the solvent includes a polar organic solvent. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these.

In certain embodiments of the invention, the coating composition according to the invention is useful as the clearcoat of an automotive composite color-plus-clear coating. Additional agents, for example surfactants, stabilizers, wetting agents, rheology control agents, adhesion promoters, UV absorbers, hindered amine light stabilizers, etc. may be incorporated into the coating composition.

Coating compositions can be coated on a substrate or article by any of a number of techniques well-known in the art. These include, for example, spray coating, dip coating, roll coating, curtain coating, and the like. For automotive body panels, spray coating is generally used.

The clearcoat coating composition according to the invention may be used as the clearcoat of a composite color-plus-clear coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources, generally temperatures between 90° C. and 180° C. In certain embodiments, the cure temperature may be between 115° C. and 150° C., and typically temperatures between 115° C. and 140° C. are used for a blocked acid-catalyzed system. For an unblocked acid-catalyzed system, the cure temperature typically may be between 80° C. and 100° C. The curing time will vary depending on the particular components used, and physical parameters such as the thickness of the layers; however, typical curing times range from 15 to 60 minutes, and more generally 15-25 minutes for blocked acid-catalyzed systems and 10-20 minutes for unblocked acid-catalyzed systems. The curing times may also be expressed as time after metal temperature reaches the bake temperature ("metal temperature"). For example, the curing time may be for 5 to 30 minutes, preferably 10 to 20 minutes, at metal temperature, In a method repairing the clearcoat layer of an automotive coating, the clearcoat layer is sanded, if necessary, to remove a defect, then the clearcoat coating composition of the invention is applied over at least a portion of the clearcoat layer to form a second clearcoat layer, which is then cured. The second clearcoat layer may be cured at from 15 minutes at 265° to 30 minutes at 300° F., already mentioned. The clearcoat composition of the invention offers significant improvement in adhesion when applied over the cured first clearcoat layer.

The invention is illustrated by the following examples. The examples are merely illustrative and do not in any way limit the scope of the invention as described and claimed. All parts are parts by weight unless otherwise noted.

EXAMPLES

Example 1

Acrylic Polymer Having Quarternary Ammonia Functionality 240 grams of n-butanol were loaded into a 3-liter glass reactor equipped with a stainless steel stirrer, condenser, heating mantle, thermocouple, and monomer and initiator addition pumps. The n-butanol was heated to 105° C. under a slight flow of nitrogen blanket.

In a separate container were mixed 330 grams hydroxyethyl methacrylate, 85.2 grams ethylhexyl acrylate, 406.8 grams ethylhexyl methacrylate, 118.6 grams VAZO® 67, 492 grams n-butanol, and 232.5 grams dimethylaminoethyl acrylate methyl chloride quarternary (80% active).

At a reactor temperature held at 105° C., the monomer and initiator mixture was added into the reactor over a period of 3 hours. After the addition was complete, the addition line was flushed with 48 grams of n-butanol. The reaction mixture was held at 105° C. for one additional hour.

The reaction mixture was then subjected to vacuum distillation to remove about 300 grams of the n-butanol. The resulting product acrylic solution was cooled and poured out. The acrylic solution was about 65 percent non-volatiles by weight, 3970H equivalent weight on non-volatiles and 1125 quaternary amine equivalent weight on non-volatiles.

Example 2

Hydroxyl Functional Acrylic Polymer 310 grams of primary amyl acetate were loaded into a 3-liter glass reactor equipped with a stainless steel stirrer, condenser, heating mantle, thermocouple, and monomer and initiator addition pumps. The amyl acetate was heated to 105° C. under a slight flow of nitrogen blanket.

In a separate container were mixed 458 grams hydroxyethyl methacrylate, 119 grams ethylhexyl acrylate, 565 grams ethylhexyl methacrylate, 136 grams VAZO® 67 and 235 grams primary amyl acetate.

At a reactor temperature held at 105° C., the monomer and initiator mixture was added into the reactor over a period of 3 hours. After the addition was complete, the addition line was flushed with 35 grams of primary amyl acetate. The reaction mixture was held at 105° C. for one additional hour.

The product acrylic solution was about 65% non-volatiles by weight and had a calculated hydroxyl equivalent weight of 3240H equivalent wt on non-volatiles.

Example 3

Nonaqueous Dispersion of Silica 145.7 grams of the Example 1 acrylic polymer was placed in a stainless steel mixing container equipped with a stainless steel stirrer. Then, 125 grams of methyl isoamy ketone and 175 grams of aromatic 100 were added while mixing. After mixing for about 15 minutes, 100 grams of deionized water was added. Mixing was continued until the mixture was homogeneous. Then, 500 grams of Nalco 1050 (50% active colloidal silica dispersion) were added with moderate agitation. The contents of the mixing container were for about 15 minutes, then poured into a 1-liter separatory funnel. The mixture phase separated within a few minutes into 2 distinct layers. The upper layer was an aqueous mixture of mostly water with small amounts of solvents, resin and silica. The lower layer contained the acrylic-silica salt, solvents, and a small amount of water. The lower layer was collected from the separatory funnel and transferred into a 1-liter flask equipped with a stainless steel stirrer, condenser, Dean Stark trap, and a thermocouple. The contents of the flask were heated to about 110° C. to distill off the residual amount of water in the solvent layer. When all of the residual water was distilled-off, the product organosol of the silica was cooled to about 5° C. then poured into a 1-liter plastic container.

The weight % non-volatiles of the product organosol was about 50%. The calculated quaternary acrylic polymer to silica equivalents ratio was 1.30:1.

Example 4

Nonaqueous Dispersion of Silica

Load 115 grams of the Example 1 acrylic resin a stainless steel mixing container equipped with a stainless steel stirrer. Add 125 grams of methyl isoamy ketone and 175 grams of aromatic 100 while mixing. Mix the batch for about 15 minutes then add 100 grams of deionized water. Continue mixing until mixing until the batch is homogeneous. Gradually add 500 grams of Nalco 1050 (50% active colloidal silica dispersion) with moderate agitation. Mix batch for about 15 minutes. Pour batch into a 1-liter separatory funnel. The batch will phase separate within a few minutes into 2 distinct layers. The upper layer is an aqueous mixture of mostly water and small of solvents, resin and silica. The lower layer contains the acrylic-silica salt, solvents and a small amount of water. Collect the lower layer and transfer into a 1-liter flask equipped with a stainless steel stirrer, condenser, Dean Stark trap, and a thermocouple. Heat batch to about 110 C to distill off the residual amount of water in the batch. When all of the residual water is distilled-off from the batch cool the batch to about 5° C. then pour into a 1-liter plastic container.

The weight % non-volatiles of the final batch is about 50%. The calculated quat acrylic to silica equivalents ratio is 1.03/1.

Example 5

Nonaqueous Dispersion of Silica with Quarternary Ammonium Functional Acrylic

Load 105 grams of the Example 1 acrylic resin into a stainless steel mixing container equipped with a stainless steel stirrer. Add 125 grams of methyl isoamy ketone and 175 grams of aromatic 100 while mixing. Mix for about 15 minutes then add 100 grams of deionized water. Continue mixing until mixing until the batch is homogeneous. Gradually add 500 grams of Nalco 1050 (50% active) colloidal silica dispersion) with moderate agitation. Mix the batch for about 15 minutes. Pour batch into a 1-liter separatory funnel. The batch will phase separate within a few minutes into 2 distinct layers. The upper layer is an aqueous mixture of mostly water and small of solvents, resin and silica. The lower layer contains the acrylic-silica salt, solvents and a small amount of water. Collect the lower layer and transfer into a 1-liter flask equipped with a stainless steel stirrer, condenser, Dean Stark trap, and a thermocouple. Heat batch to about 110° C. to distill off the residual amount of water in the batch. When all of the residual water is distilled-off from the batch cool the batch to about 50° C. then pour into a 1-liter plastic container.

The weight % non-volatiles of the final batch is about 50%. The calculated quat acrylic to silica equivalents ratio is 0.94/1.

Example 6

Comparative Example with No Inorganic Particles

The following ingredients were blended with agitation:

| | |
|---|---:|
| Resin from example 2 | 283.0 g |
| diethyleneglycol monobutylether acetate | 27.0 |
| Tinuvin 384 | 14.8 |
| Tinuvin 292 | 4.7 |
| butyl glycolate | 12.1 |
| BYK 310 | 2.0 |
| ethoxypropyl acetate | 27.6 |
| ethyleneglycol monobutylether acetate | 31.0 |
| Desmodur N3300 | 126.6 |
| Desmodur Z4370 | 45.6 g |

Example 7

Coating Composition with 29% by Weight Inorganic Particles on Vehicle

The following ingredients were blended with agitation:

| | |
|---|---:|
| Resin from example 2 | 174.9 g |
| diethyleneglycol monobutylether acetate | 16.7 |
| Tinuvin 384 | 9.2 |
| Tinuvin 292 | 2.9 |
| butyl glycolate | 7.5 |
| BYK 310 | 1.3 |
| ethoxypropyl acetate | 17.1 |
| ethyleneglycol monobutylether acetate | 19.6 |
| Resin from example 3 | 187.3 |
| Desmodur N3300 | 92.1 |
| Desmodur Z4370 | 32.8 g |

Example 8

Coating Composition with 89% by Weight Inorganic Particles on Vehicle

The following ingredients were blended with agitation:

| Resin from example 2 | 66.0 g |
|---|---|
| diethyleneglycol monobutylether acetate | 17.6 |
| Tinuvin 384 | 8.8 |
| Tinuvin 292 | 2.2 |
| BYK 310 | 1.3 |
| Resin from example 3 | 373.7 |
| Desmodur N3300 | 57.3 |
| Desmodur Z4370 | 20.5 g |

Preparation of Coated Substrates and Testing

A commercially available waterborne basecoat (E178 KW405 batch number 0101302494 from BASF Corporation) was sprayed over 4 inch×12 inch primed and electrocoated steel panels. The panels were flashed for ten minutes at 60° C. Each of the clearcoats of Examples 6-8 was then spray applied over these basecoated panels and baked for 25 minutes at 140° C.

These panels were then tested for scratch resistance using the Crockmeter (Atlas Instruments) method with 9 micron abrasive paper (281Q wetodry from 3M Corp.). After ten double rubs the following 20 degree gloss retention values were obtained.

| Clearcoat | initial gloss | final gloss | percent retention |
|---|---|---|---|
| Example 6 (comparative) | 84 | 47 | 56 |
| Example 7 | 84 | 52 | 62 |
| Example 8 | 65 | 6.5 | 100 |

Example 9

Comparative

The following ingredients were blended with agitation:

| Resin from example 2 | 106.0 g |
|---|---|
| diethyleneglycol monobutylether acetate | 4.8 |
| Tinuvin 384 | 7.4 |
| Tinuvin 292 | 1.9 |
| BYK 310 | 0.7 |
| ethyleneglycol monobutylether acetate | 11.0 |
| Resin from example 3 | 373.7 |
| Desmodur N3300 | 35.4 |
| Desmodur Z4370 | 12.6 g |

Example 10

Coating Composition with 100% by Weight Inorganic Particles on Vehicle

The following ingredients were blended with agitation:

| Resin from example 2 | 14.2 g |
|---|---|
| diethyleneglycol monobutylether acetate | 2.0 |
| Tinuvin 384 | 3.1 |
| Tinuvin 292 | 0.8 |
| BYK 310 | 0.3 |
| Resin from example 3 | 139.8 |
| Desmodur N3300 | 14.6 |
| Desmodur Z4370 | 5.2 g |

Example 11

Coating Composition with 100% by Weight Inorganic Particles on Vehicle

The following ingredients were blended with agitation:

| Resin from example 2 | 20.5 g |
|---|---|
| diethyleneglycol monobutylether acetate | 2.0 |
| Tinuvin 384 | 3.1 |
| Tinuvin 292 | 0.8 |
| BYK 310 | 0.3 |
| ethyleneglycol monobutylether acetate | 2.4 |
| Resin from example 4 | 131.2 |
| Desmodur N3300 | 14.6 |
| Desmodur Z4370 | 5.2 g |

Example 12

Coating Composition with 100% by Weight Inorganic Particles on Vehicle

The following ingredients were blended with agitation:

| Resin from example 2 | 22.2 g |
|---|---|
| diethyleneglycol monobutylether acetate | 2.0 |
| Tinuvin 384 | 3.1 |
| Tinuvin 292 | 0.8 |
| BYK 310 | 0.3 |
| ethyleneglycol monobutylether acetate | 4.5 |
| Resin from example 5 | 127.5 |
| Desmodur N3300 | 14.6 |
| Desmodur Z4370 | 5.2 g |

Preparation of Coated Substrates and Testing

A commercially available waterborne basecoat (E178KW405 batch number 0101302494 from BASF Corporation) was sprayed over 4 inch ×12 inch primed and electrocoated steel panels. The panels were flashed for ten minutes at 60° C. Each of the clearcoats of Examples 9-12 was then spray applied over these basecoated panels and baked for 25 minutes at 140° C.

These panels were then tested for scratch resistance using the Crockmeter (Atlas Instruments) method with 9 micron abrasive paper (281Q wetodry from 3M Corp.). After ten double rubs the following 20 degree gloss retention values were obtained.

| Clearcoat | initial gloss | final gloss | percent retention |
|---|---|---|---|
| Example 9 (comparative) | 84 | 27 | 37 |
| Example 10 | 44 | 56 | 127 |
| Example 11 | 66 | 67 | 102 |
| Example 12 | 56 | 54 | 94 |

Example 13

Coating Composition with 100% by Weight Inorganic Particles on Vehicle

The following ingredients were blended with agitation:

| | |
|---|---|
| Resin from example 2 | 56.0 g |
| diethyleneglycol monobutylether acetate | 4.0 |
| Tinuvin 384 | 6.0 |
| Tinuvin 292 | 1.5 |
| BYK 310 | 0.6 |
| ethyleneglycol monobutylether acetate | 4.8 |
| Resin from example 4 | 260.2 |
| Desmodur N3300 | 19.2 |
| Desmodur Z4370 | 6.9 g |

Example 14

Coating Composition with 80% by Weight Inorganic Particles on Vehicle

The following ingredients were blended with agitation:

| | |
|---|---|
| Resin from example 2 | 64.2 g |
| diethyleneglycol monobutylether acetate | 4.0 |
| Tinuvin 384 | 6.0 |
| Tinuvin 292 | 1.5 |
| BYK 310 | 0.6 |
| ethyleneglycol monobutylether acetate | 12.0 |
| Resin from example 4 | 208.2 |
| Desmodur N3300 | 21.2 |
| Desmodur Z4370 | 7.6 g |

Example 15

Coating Composition with 60% by Weight Inorganic Particles on Vehicle

The following ingredients were blended with agitation:

The following ingredients were blended with agitation:

| | |
|---|---|
| Resin from example 2 | 70.4 g |
| diethyleneglycol monobutylether acetate | 4.0 |
| Tinuvin 384 | 6.0 |
| Tinuvin 292 | 1.5 |
| BYK 310 | 0.6 |
| ethyleneglycol monobutylether acetate | 19.0 |
| Resin from example 4 | 156.1 |
| Desmodur N3300 | 23.3 |
| Desmodur Z4370 | 8.3 g |

Preparation of Coated Substrates and Testing

A commercially available waterborne basecoat (E178KW405 batch number 0101302494 from BASF Corporation) was sprayed over 4 inch ×12 inch primed and electrocoated steel panels. The panels were flashed for ten minutes at 60° C. Each of the clearcoats of Examples 13-15 was then spray applied over these basecoated panels and baked for 25 minutes at 140° C.

These panels were then tested for scratch resistance using the Crockmeter (Atlas Instruments) method with 9 micron abrasive paper (281Q wetodry from 3M Corp.). After ten double rubs the following 20 degree gloss retention values were obtained.

| Clearcoat | initial gloss | final gloss | percent retention |
|---|---|---|---|
| Example 9 (comparative) | 84 | 27 | 37 |
| Example 13 | 74 | 73 | 99 |
| Example 14 | 76 | 68 | 91 |
| Example 15 | 79 | 67 | 85 |

Example 16

Organic Dispersion of Clay 50 g of Bentolite L (Southern Clay Products) was dispersed in 450 g of R.O. water using a Cowles blade high speed agitator. 100 g of the resin of Example 2, 125 g of methylamyl ketone, 75 g of VM&P naptha and 100 g of butanol were added with low speed agitation followed by 20 minutes of sonication in an Aquasonic model 50T ultrasonic bath. After standing overnight, this material separated into two layers, The aqueous layer was decanted yielding a dispersion of clay in organic solvents.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of preparing a coating composition, comprising
    mixing together a combination comprising inorganic particles and water with an organic solvent and a polymer or oligomer containing quarternary ammonium groups to form a mixture;
    allowing the mixture to separate into an aqueous layer and an organic layer; and
    incorporating the organic layer into a clearcoat coating composition.

2. A method of preparing a coating composition according to claim 1, further comprising removing residual water from the organic layer before incorporating the organic layer into the clearcoat coating composition.

3. A clearcoat coating composition made by this method of claim 1.

4. A method of coating a substrate, comprising applying to the substrate the coating composition of claim 3 and curing the applied coating composition to produce a coating layer on the substrate.

5. A method of preparing an organosol of inorganic particles, comprising
    mixing an aqueous mixture comprising water and inorganic particles with an organic solvent and a polymer or oligomer having functionality that adsorbs onto the inorganic particles and
    allowing the mixture to separate into an aqueous layer and an organic layer comprising the inorganic particles.

6. A method according to claim 5, wherein the organic layer is separated from the aqueous layer.

7. A method according to claim 5, wherein the functionality that adsorbs onto the inorganic particles comprises quaternary ammonium groups.

8. A method according to claim 6, wherein the inorganic particles have cations that form water-soluble salts with a counteranion of the quaternary ammonium groups.

9. A method of preparing a coating composition, comprising mixing an aqueous composition comprising inorganic particles with an organic solvent and a polymer or oligomer having functionality that adsorbs onto the inorganic particles to form a mixture; allowing the mixture to separate into an aqueous layer and an organic layer; and incorporating the organic layer into a coating composition.

10. A method according to claim 9, wherein the coating composition is a topcoat or clearcoat coating composition.

11. A method according to claim 9, wherein the organic layer is treated to remove residual water before being incorporated into the coating composition.

12. A method according to claim 9, wherein the functionality that adsorbs onto the inorganic particles comprises quaternary ammonium groups.

13. A method according to claim 9, wherein the coating composition is applied onto a substrate.

14. A method according to claim 9, wherein the inorganic particles are substantially colorless.

15. A method according to claim 9, wherein the inorganic particles have an average particle size of less than 50 microns.

16. A method according to claim 9, wherein the inorganic particles are generally spherical.

17. A method according to claim 9, wherein the inorganic particles are platy, elongated, whiskers, or microfibers.

18. A method according to claim 9, wherein the inorganic particles are composite particles.

19. A method according to claim 9, wherein the inorganic particles comprise a member selected from the group consisting of metal oxides, metal carbides, metal nitrides, metal sulfides, metal silicates, metal borides, metal carbonates, and combinations thereof.

20. A method according to claim 9, wherein the inorganic particles comprise a member selected from the group consisting of silica, alumina, silicone carbide, zirconia, yttria, clay, talc, and combinations thereof.

21. A method according to claim 9, wherein the polymer having functionality that adsorbs onto the inorganic particles comprises a member selected from the group consisting of vinyl polymers, acrylic polymers, silicones, polyesters, polyethers, polycarbonates, polyamides, polyurethanes, graft copolymers thereof, and combinations thereof.

22. A method according to claim 9, wherein the functionality that adsorbs onto the inorganic particles comprises a member selected from the group consisting of quaternary ammonium salts, carboxylic acid groups, and hydrogen bonding groups.

23. A method according to claim 9, wherein the polymer having functionality that adsorbs onto the inorganic particles comprises a functionality reactive with a vehicle of the coating composition.

24. A method of incorporating inorganic particles into a polymer composition, comprising
mixing an aqueous dispersion of inorganic particles with an organic liquid and a polymer or oligomer having functionality that adsorbs onto the inorganic particles to form a mixture;
allowing the mixture to separate into an aqueous layer and an organic layer;
incorporating the organic layer into a composition comprising at least one polymer other than the polymer having functionality that adsorbs onto the inorganic particles.

25. A method according to claim 24, wherein the organic liquid comprises an organic solvent.

26. A method according to claim 24, wherein the organic liquid comprises a liquid plasticizer.

27. A method according to claim 24, comprising a further step of forming the polymer composition into an article.

28. A method according to claim 27, wherein the polymer composition is cured during forming of the article.

29. A method according to claim 24, wherein the inorganic particles have an average particle size of less than 50 microns.

30. A method according to claim 24, wherein the inorganic particles are generally spherical.

31. A method according to claim 24, wherein the inorganic particles are platy, elongated, whiskers, or microfibers.

32. A method according to claim 24, wherein the inorganic particles comprise a member selected from the group consisting of metal oxides, metal carbides, metal nitrides, metal sulfides, metal silicates, metal borides, metal carbonates, and combinations thereof.

33. A method according to claim 24, wherein the inorganic particles comprise a member selected from the group consisting of silica, alumina, silicone carbide, zirconia, yttria, clay, talc, and combinations thereof.

34. A method according to claim 24, wherein the polymer having functionality that adsorbs onto the inorganic particles comprises a member selected from the group consisting of vinyl polymers, acrylic polymers, silicones, polyesters, polyethers, polycarbonates, polyamides, polyurethanes, graft copolymers thereof, and combinations thereof.

35. A method according to claim 24, wherein the functionality that adsorbs onto the inorganic particles comprises a member selected from the group consisting of quaternary ammonium salts, carboxylic acid groups, and hydrogen bonding groups.

36. A method according to claim 24, wherein the polymer having functionality that adsorbs onto the inorganic particles comprises a functionality reactive with a component of the polymer composition.

37. A method according to claim 1, wherein the oligomer having functionality that adsorbs onto the inorganic particles further comprises a polymerizable functionality, and further wherein the oligomer is polymerized before being incorporated into the clearcoat coating composition.

38. A method according to claim 6, wherein the oligomer having functionality that adsorbs onto the inorganic particles further comprises a polymerizable functionality, and further wherein the oligomer is polymerized after the organic layer is separated from the aqueous layer.

39. A method according to claim 9, wherein the oligomer having functionality that adsorbs onto the inorganic particles further comprises a polymerizable functionality, and further wherein the oligomer is polymerized before the organic layer is incorporated into the coating composition.

40. A method according to claim 24, wherein the oligomer having functionality that adsorbs onto the inorganic particles further comprises a polymerizable functionality, and further wherein the oligomer is polymerized after the mixture is separated into an aqueous layer and an organic layer.

* * * * *